(12) United States Patent
Kao et al.

(10) Patent No.: US 6,341,768 B1
(45) Date of Patent: Jan. 29, 2002

(54) STRUCTURE OF TORSION SHOCK ABSORBER

(76) Inventors: Chuan-Fu Kao; Yun-Chuan Chang, both of P.O. Box No. 6-57, Chung-Ho City, Taoyuan Hsien 235 (TW)

( * ) Notice: Subject to any disclaimer, the term of this patent is extended or adjusted under 35 U.S.C. 154(b) by 0 days.

(21) Appl. No.: 09/526,171

(22) Filed: Mar. 15, 2000

(51) Int. Cl.⁷ .................................. F16F 1/14
(52) U.S. Cl. ................ 267/273; 267/154; 280/275; 280/283
(58) Field of Search ..................... 267/140.11, 154, 267/273, 274, 276; 280/274, 275, 281.1, 283, 288, 284

(56) References Cited

U.S. PATENT DOCUMENTS

| | | | | |
|---|---|---|---|---|
| 4,451,065 A | * | 5/1984 | Williams, Jr. ............... | 280/284 |
| 5,360,078 A | * | 11/1994 | Rifenburg et al. .......... | 180/227 |
| 5,611,557 A | * | 3/1997 | Farris et al. ................. | 280/275 |
| 6,131,934 A | * | 10/2000 | Sinclair ....................... | 280/284 |

* cited by examiner

*Primary Examiner*—Pam Rodriguez
(74) *Attorney, Agent, or Firm*—Troxell Law Office PLLC

(57) ABSTRACT

An improved torsion shock absorber has a curved clevis rocker arm and a solid rocker arm. Mounting holes are formed through one rounded end each of the rocker arms and bush holes through opposite rounded ends, each having symmetrical notches respectively machined along the inner circumferences. A torsion shaft of a spring steel is inserted into the bush holes of the rocker arms, and into the holes of corresponding mounting rings and a torque seat, a faced washer and a bushing are placed in the bush hole opening of the solid rocker arm, and a C-shaped circlip is fitted into each of the two ends of the torsion shaft. The mounting holes of the clevis rocker arm and the solid rocker arm are then attached to different force receiving entities.

3 Claims, 4 Drawing Sheets

STRUCTURE OF TORSION SHOCK ABSORBER

BACKGROUND OF THE INVENTION

1) Field of the Invention

The invention herein relates to an improved structure torsion shock absorber that is capable of reciprocal direction shock absorption performance and, furthermore, is of more compact dimensions and requires less raw materials to fabricate.

2) Description of the Prior Art

Conventional bicycle, motorcycle, and automobile frame or chassis shock absorbers often consist of a coarse steel material that is coiled into a spring, with the spring then conjoined to mounts, enabling one end of the spring to be installed to the bottom end of the frame or chassis of the said force receiving entities such that the tensility of the spring buffers the motion of the undulating force receiving entities. Since such conventional shock absorbers are of larger physical dimensions, they require more raw materials to produce and, furthermore, are only capable of absorbing shock in a single direction. Thus, positioning must be carefully considered before installation. This is far from ideal and such shortcomings have long annoyed manufacturers and consumers. Therefore, a torsion shock absorber structure capable of enhanced performance and having greater practical value is truly necessary, which is the central motivation of the invention herein.

SUMMARY OF THE INVENTION

Therefore, the primary objective of the invention herein is to provide an improved structure torsion shock absorber comprised of a curved clevis rocker arm and solid rocker arm, with mounting holes formed through one rounded end of the rocker arms and bush holes formed through the opposite rounded end having symmetrical notches respectively machined along the inner circumferences; to assemble the shock absorber, a torsion shaft constructed of a spring steel material is inserted into the bush holes of the rocker arms, respective insertion is accomplished into the holes of the corresponding mounting rings and torque seat, a faced washer and a bushing are placed in the bush hole opening of the solid rocker arm, and a C-shaped circlip is fitted onto each of the two ends of the torsion shaft; the mounting holes of the clevis rocker arm and the solid rocker arm are then installed to force receiving entities, wherein the tensility of the torsion shaft is capable of reciprocal shock absorption performance.

Another objective of the invention herein is to provide an improved structure torsion shock absorber in which the reciprocating operation of the shock absorber facilitates installation to different force receiving entities to thereby increase its practical value and, furthermore, since the present invention is of more compact dimensions, less raw materials are required for fabrication, which reduces production cost.

To enable a further understanding of the major features and innovations of the present invention, the brief description of the drawings below are followed by the detailed description of the invention herein.

DETAILED DESCRIPTION OF THE INVENTION

Figure 1:
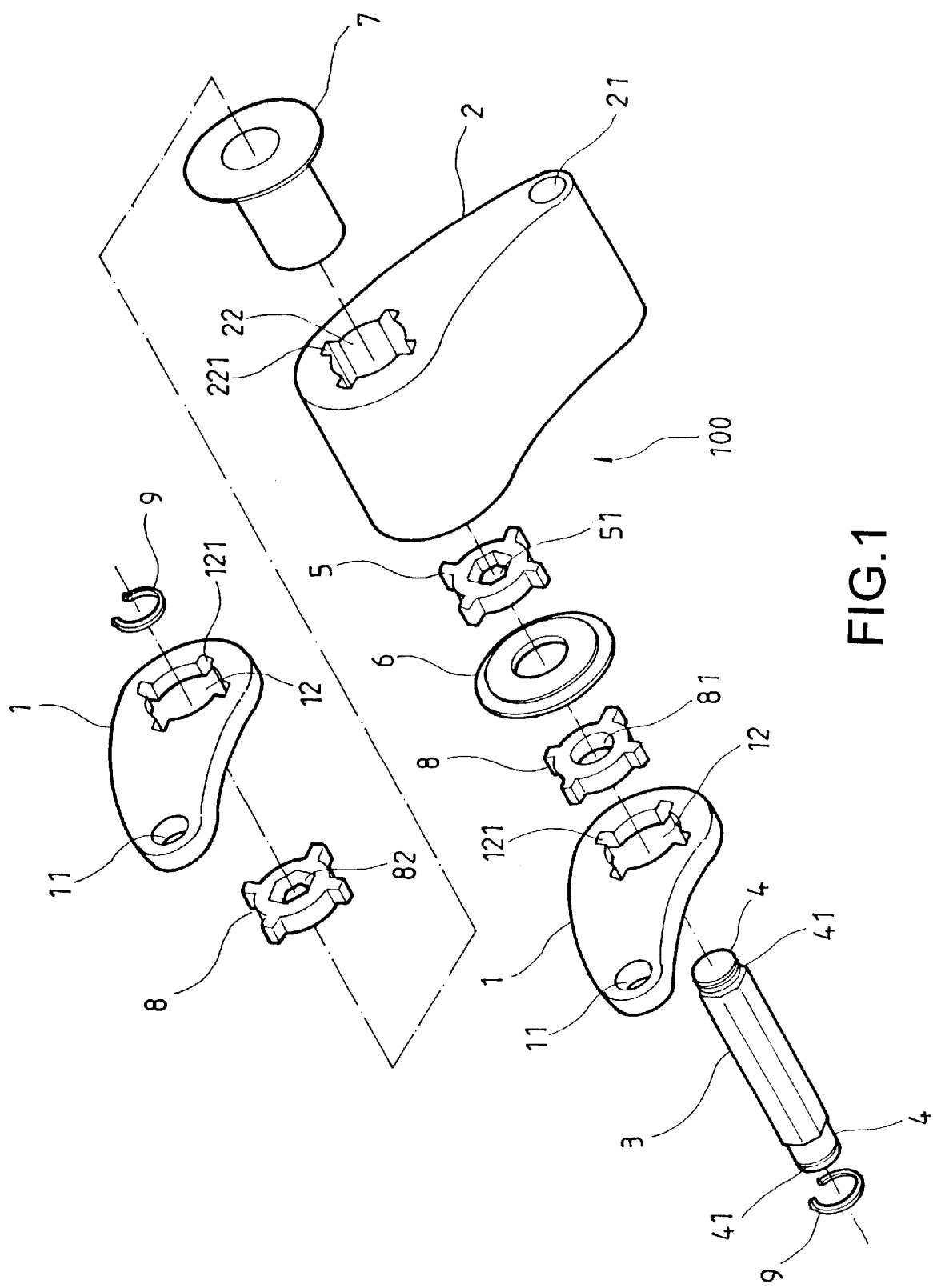
FIG. 1 is an exploded drawing of the invention herein.
Figure 2:
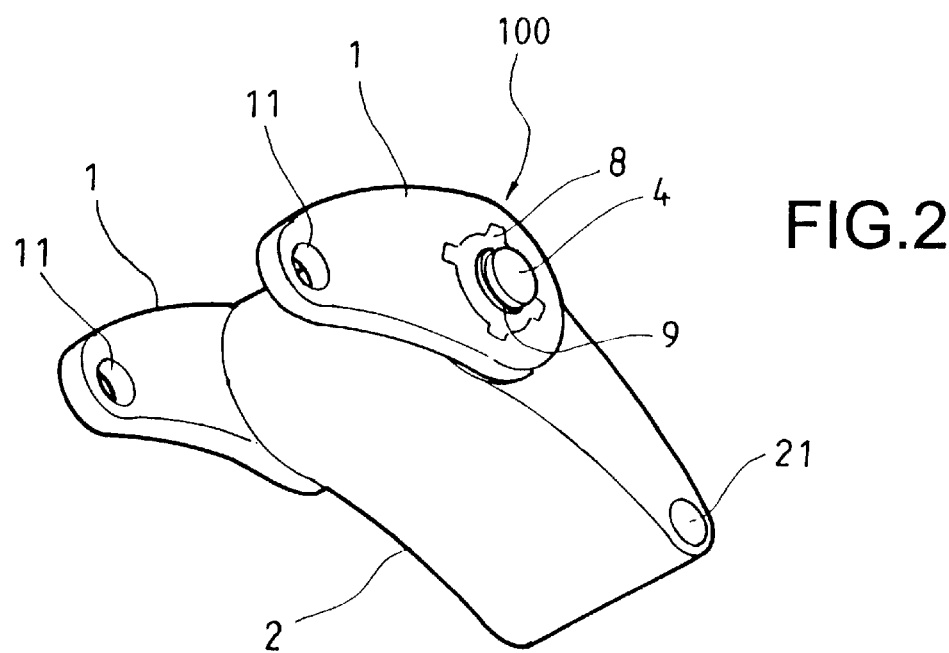
FIG. 2 is an isometric drawing of the invention herein.

Referring to FIG. 1 and FIG. 2, the invention herein is comprised of a clevis rocker arm 1 consisting of two planar elements and a solid rocker arm 2 that are of a gradually narrowing curved profile towards one end; mounting holes 11 and 21 are formed through one rounded end of the rocker arms 1 and 2, respectively, and bush holes 12 and 22 through the opposite rounded end having symmetrical notches 121 and 221 respectively machined along the inner circumferences that provide for the insertion and nesting of a torsion shaft 3.

The said torsion shaft 3 is constructed of a spring steel material and is hexagonal in shape and, furthermore, an annular groove 41 is formed around each of the cylindrical extremities 4 at the two ends such that after the said torsion shaft 3 is inserted into the hexagonal hole 51 of a torque seat 5, the said torque seat 5 is placed in the bush hole 22 of the solid rocker arm 2 (the outer profile of the said torque seat 5 matches that of the bush hole 22, but is slightly smaller than the said bush hole 22); then, after a faced washer 6 and a plastic bushing 7 are respectively placed in the bush hole 22 of the solid rocker arm 2, the cylindrical extremities 4 of the said torsion shaft 3 are respectively inserted into the round hole 81 and the hexagonal hole 82 at the center of mounting rings 8; then, the mounting rings 8 are placed into the bush hole 12 of the clevis rocker arm 1 (the outer profile of the said mounting rings 8 match that of the bush hole 12, but are slightly smaller than the said bush hole 12) and, furthermore, a C-shaped circlip 9 is fitted onto each of the annular grooves 41 to complete the assembly of a curved torsion shock absorber 100, with the mounting holes 11 and 21 of the clevis rocker arm 1 and the solid rocker arm 2 enabling installation to different force receiving entities (such as a bicycle or a motorcycle), wherein the tensility of the torsion shaft 3 is capable of reciprocal direction shock absorption performance.

Figure 3:
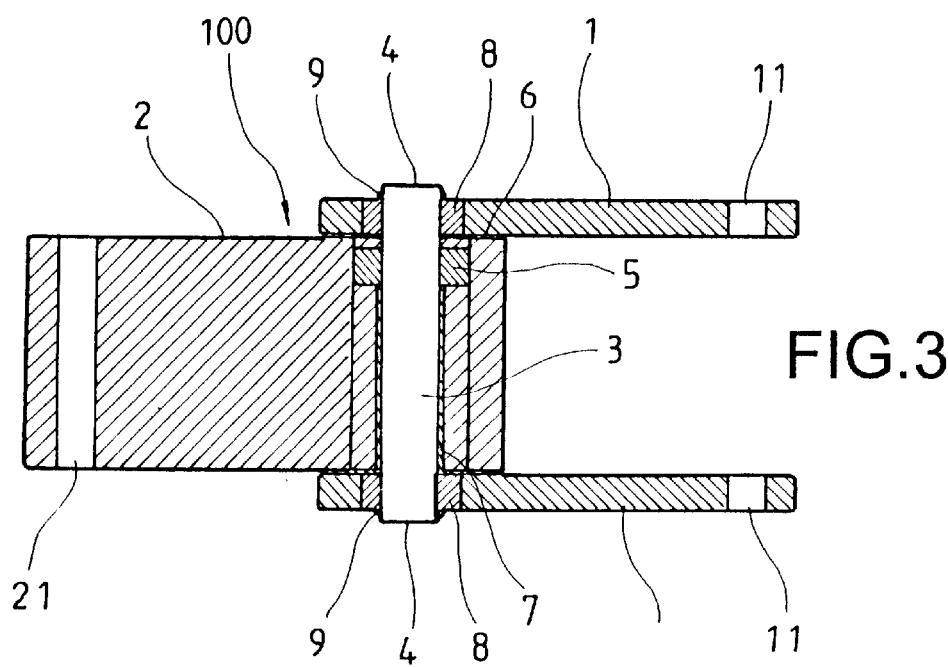
FIG. 3 is a cross-sectional drawing of the invention herein.

Referring to FIG. 3 and FIG. 2, following the assembly of the invention herein, since the hexagonal section of the torsion shaft 3 is fixed in the torque seat 5, the torque seat 5 is situated in the solid rocker arm 2, the cylindrical extremities 4 of the said torsion shaft 3 are positioned in the round hole 81 and the hexagonal hole 82 at the center of the mounting rings 8, and the mounting rings 8 are positioned in the clevis rocker arm 1, when the mounting holes 11 and 21 of the rocker arms 1 and 2, respectively, are subjected to forces of fluctuating upward and downward travel, the tensility of the torsion shaft 3 governs the rhythmical swaying of the rocker arms 1 and 2 and thereby achieves shock absorption performance.

Figure 4:
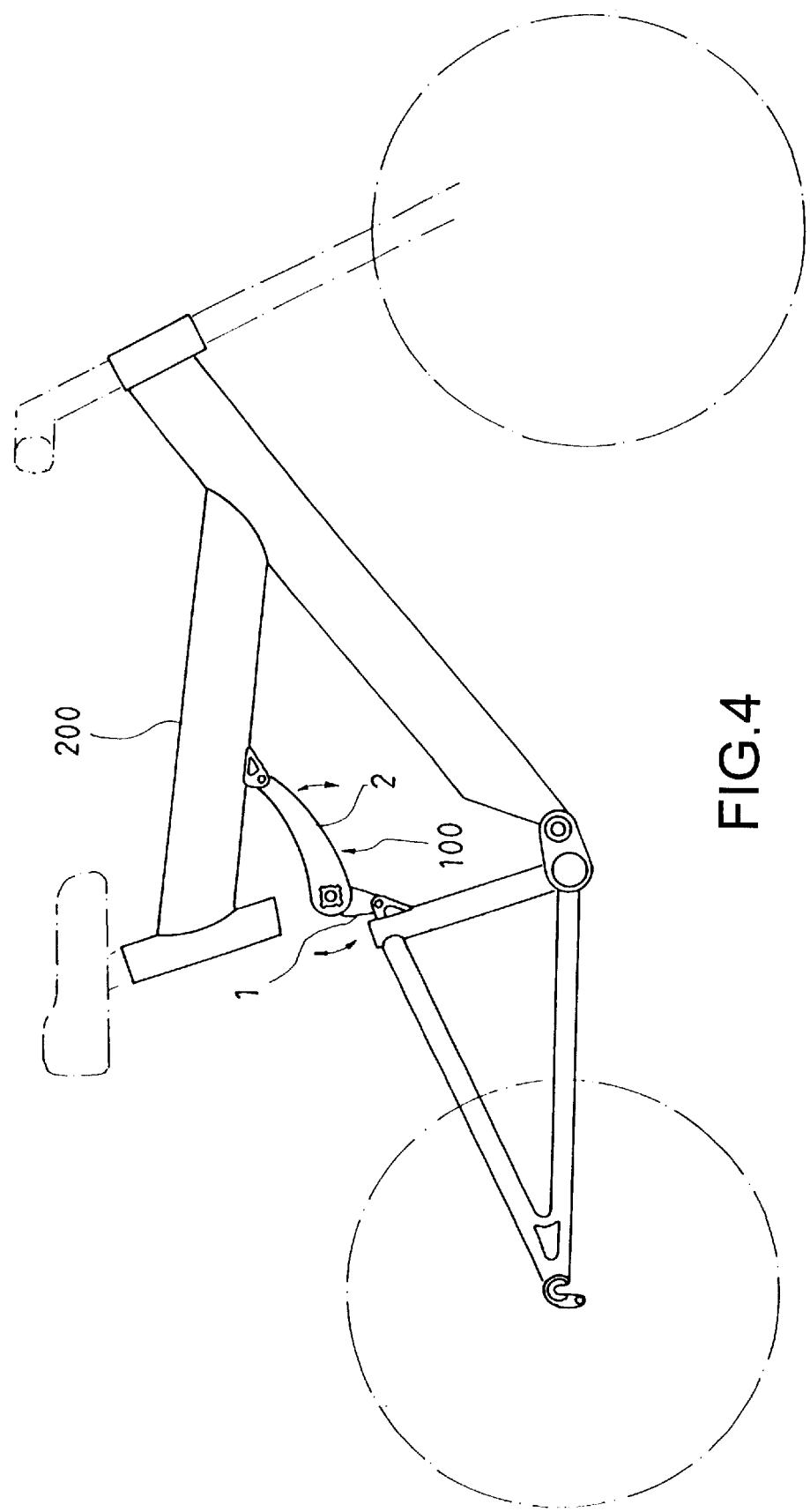
FIG. 4 is an orthographic drawing of the invention herein installed on a bicycle.

Referring to FIG. 4, when the invention herein is installed to the frame of a bicycle 200, sudden chassis undulations are cushioned by the shock absorber 100.

Figure 5:
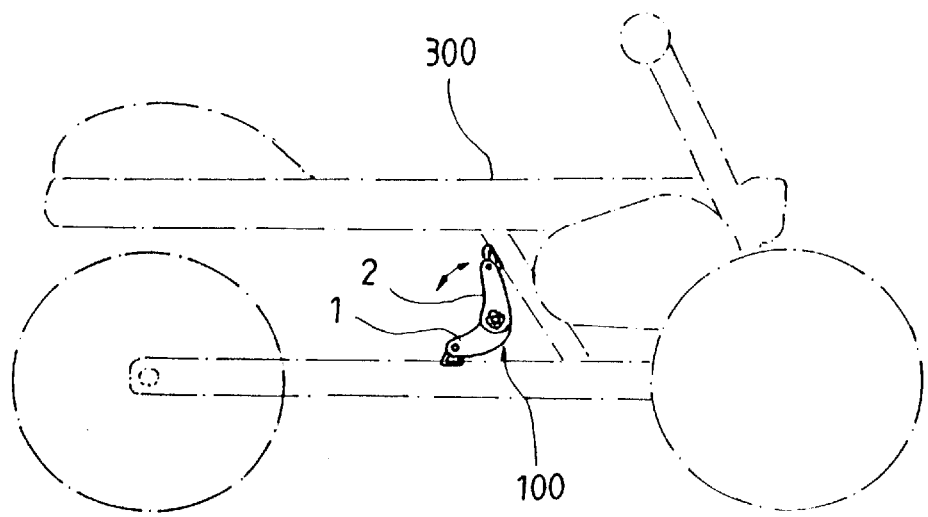
FIG. 5 is an orthographic drawing of the invention herein installed on a motorcycle.
Figure 6:
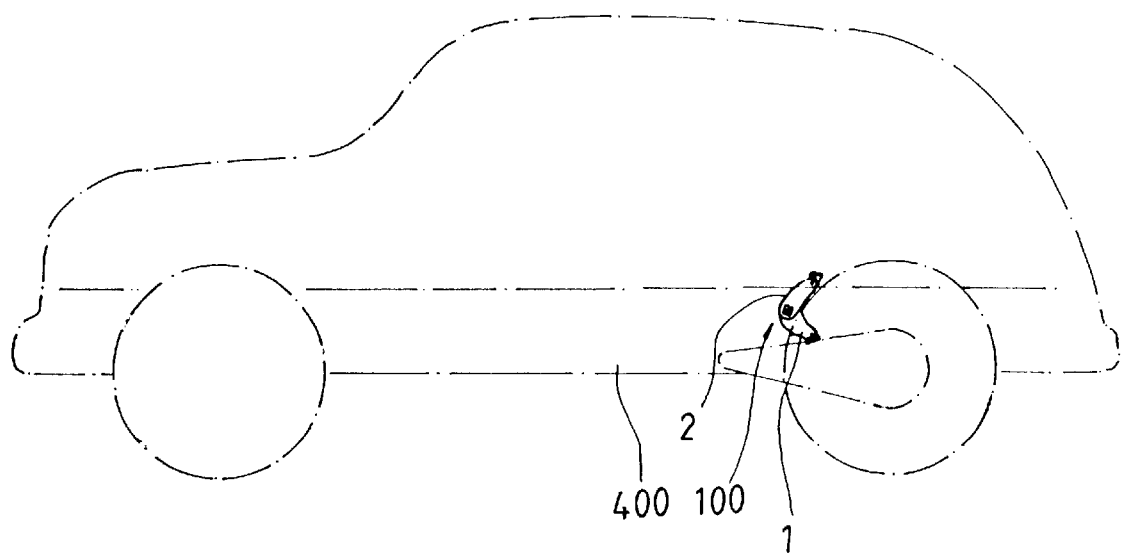
FIG. 6 is an orthographic drawing of the invention herein installed on an automobile.

Referring to FIG. 5 and FIG. 6, the invention herein can be utilized on a motorcycle 300 and an automobile 400, wherein the appropriate installation of the shock absorber 100 enables the reciprocal articulation of the shock absorber 100 at the mounting positions to buffer chassis oscillation and thereby accomplish the objective of shock absorption.

In summation of the foregoing section, since the arrangement of the curved rocker arms 1 and 2 along with the torsion shaft 3 of the invention herein constitutes a concussive vibration moderating structure in which the resultant shock absorber 100 is capable of regulating upward and downward travel and, furthermore, is of compact dimensions and requires less raw materials to fabricate, therefore, the practical and original design of the present invention is lawfully submitted to the patent bureau for review and the granting of the commensurate patent rights.

What is claimed is:

1. An improved torsion shock absorber comprising:

a clevis rocker arm consisting of two planar elements that are of a gradually narrowing curved profile each having a first mounting hole formed through a first rounded end and a first bush hole with symmetrical notches machined along an inner circumference through a second, opposite rounded end;

a solid rocker arm of a gradually narrowing curved profile having a second mounting hole formed through a first rounded end thereof and a second bush hole with symmetrical notches machined along an inner circumference through a second, opposite rounded end thereof;

a torque seat having an outer profile matching that of the second bush hole of the solid rocker arm, but is smaller than the second bush hole, the torque seat having a first hexagonal hole formed through a center thereof;

two mounting rings, each having an outer profile matching that of the first bush hole of each planar element of the clevis rocker arm, but are smaller than each first bush hole, each mounting ring having a hole formed through a center thereof;

a torsion shaft hexagonal in cross-sectional shape and having a cylindrical extremity extending from each of two opposite ends and an annular groove formed around each of the cylindrical extremities;

whereby, after the torsion shaft is inserted into the torque seat, the torque seat is placed in the second bush hole of the solid rocker arm, the cylindrical extremities at the two ends of the torsion shaft are inserted into the mounting rings, enabling the placement of the mounting rings into the first bush hole of each planar element of the clevis rocker arm and thereby forming a torsion shock absorber.

2. The improved torsion shock absorber of claim 1 further comprising a faced washer and a bushing respectively placed into the second bush hole to prevent friction between the clevis and solid rocker arms.

3. The improved torsion shock absorber of claim 1 further comprising a C-shaped circlip fitted into each of the annular grooves around the cylindrical extremities of the torsion shaft after insertion of the torsion shaft into the second bush hole of the solid rocker arm.

* * * * *